United States Patent [19]

Sheng-Jung

[11] Patent Number: 4,940,887

[45] Date of Patent: Jul. 10, 1990

[54] AUTOMATIC MAIL HANDLING AND POSTAGE VENDING MACHINE

[76] Inventor: Wu Sheng-Jung, 389, Sec. 5, Nanking East Rd., Taipei

[21] Appl. No.: 920,648

[22] Filed: Oct. 20, 1986

[51] Int. Cl.[5] ........................ G06F 15/21; G06F 15/30

[52] U.S. Cl. .................................... 235/381; 235/375; 235/432; 235/383; 364/464.03; 364/478

[58] Field of Search ............... 235/375, 376, 381, 383, 235/385, 419, 424, 425, 432, 487; 364/466, 464, 478, 479, 409, 400–403, 464.02, 464.03; 177/25.17, 25.11, 25.15, 154–159; 209/900, 584; 194/344, 346

[56] References Cited

U.S. PATENT DOCUMENTS

| | | | |
|---|---|---|---|
| 2,858,124 | 10/1958 | Allen et al. | 177/154 |
| 3,290,491 | 12/1966 | Wahlberg | 364/464.03 |
| 3,613,808 | 10/1971 | Bunnelle | 177/157 |
| 3,635,297 | 1/1972 | Salava | 364/464.03 |
| 4,024,380 | 5/1977 | Gunn | 235/487 |
| 4,051,942 | 10/1977 | Suzuki et al. | 235/432 |
| 4,319,328 | 3/1982 | Eggert | 364/466 |
| 4,495,581 | 1/1985 | Piccione | 364/466 |
| 4,579,213 | 4/1986 | Rhine et al. | 235/383 |
| 4,584,648 | 4/1986 | Dlugos | 364/466 |
| 4,595,984 | 6/1986 | Daniels | 364/466 |
| 4,639,918 | 1/1987 | Linkowski | 364/464.02 |
| 4,710,883 | 12/1987 | Wilson et al. | 364/466 |

*Primary Examiner*—Alan Faber
*Assistant Examiner*—Robert A. Weinhardt
*Attorney, Agent, or Firm*—Klein & Vibber

[57] ABSTRACT

A computerized handling device automatically processes mail items. The device includes a housing, a coin identifying and changing device, and a microcomputer controller, and has an inlet for mail items. Also included are mechanisms for causing the return of a mail item to a user, for conveying a mail item to a weighing station, to enable a user to select a desired mail classification, for calculating the appropriate postage for a mail item, for indicating to a user the weight of and postage due on a mail item, for receiving payment from a user, for verifying the payment against the postage due on a mail item, for automatic stamping a postage marking on the mail item at a postage marking station and for sorting mail items in accordance with their classification. The device is constructed so that varied weight and classifications of mail items can be processed through an interactive action with the user.

17 Claims, 8 Drawing Sheets

AUTOMATIC MAIL HANDLING AND POSTAGE VENDING MACHINE

BACKGROUND OF THE INVENTION

Traditionally, for sending mail items, it is necessary either to buy postage stamps to stick on the mail items or to arrange for the mail to be weighed by service personnel in the post office and then buy the exact amount of postage stamps (or postage labels) to stick on the mail items before mailing them. Both methods have disadvantages. For example, with the first method, mail can be sent with insufficient postage, and it is necessary to purchase postage stamps and physically stick them onto mail items. In the second case, much of the sender's time tends to be wasted.

After collecting mail items from mail boxes, mailmen are required to handle sophisticated jobs such as picking out overweight mail items, stamp cancellation and sorting etc. These jobs are often performed manually.

A known self-service post counter accepts coins and franked mail automatically without the need to stick on postage stamps. However, existing self-service post counters are unable to calculate postage and are only suitable for regular and express mail. Recently, it has been proposed to connect an electronic weigher and a postage marking machine having a microcomputer to a self-service post counter. Although the resulting machine provides the functions of weighing, calculating postage, and recording, it is still necessary for dating to be done by hand and the whole system must be operated by manual labour. Furthermore, it is not possible to simplify the mailing procedure. Thus, the disadvantages of wasted time and labour and the possibility of human error still exist.

The present inventor has carried out research and has developed a virtually automatic post counter to match the developing trend of computerization.

SUMMARY OF THE INVENTION

In accordance with the invention, there is provided an automatic mail handling device including a housing, a coin identifying and changing device, and a microcomputer controller, and having an inlet for mail items, means, for example a button, operable by the user for causing the return of a mail item to a user, means for conveying a mail item to a weighing station, means to enable a user to select a desired mail classification, means for calculating the appropriate postage for a mail item in dependence upon the weight and mail classification thereof, indicating means for indicating to a user the weight of and postage due on a mail item, means, for example, a coin, banknote, or credit card slot, for receiving a payment token from a user, means for verifying the payment token against the postage due on a mail item, means for transporting mail items automatically on verification of the payment, means for sorting mail items in accordance with their classification and means for enabling the output from the device of the total of numbers of items and postage amounts for each mail classification.

BRIEF DESCRIPTION OF THE DRAWING

A preferred embodiment of the invention is illustrated by the accompanying drawing, in which like numerals designate similar parts and in which.

DESCRIPTION OF THE PREFERRED EMBODIMENTS

Figure 1:
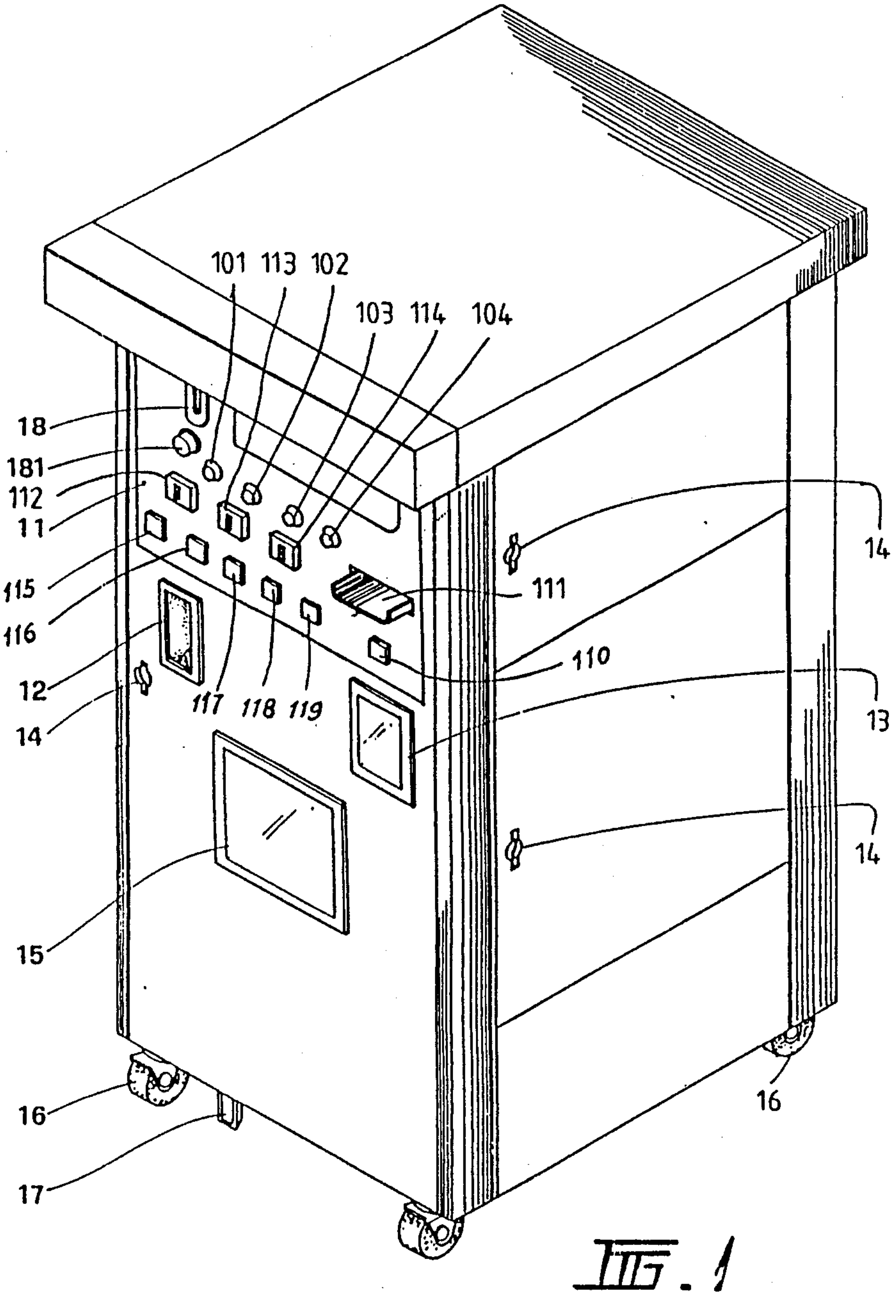
FIG. 1 is a perspective view of an automatic mail items handling device according to a preferred embodiment of this invention.

Referring now to FIG. 1, a device according to the invention includes a housing containing a front door, a rear door, a right side upper door, and a right side lower door. The interior of said housing is partitioned into chambers which are available for use by post office personnel and maintenance personnel. A face panel 11 is provided with a mail inlet/outlet 111, a slot 18, a refund button 181, mail classification select buttons 115–119, a mail return button 110, indicator lights 101–104, and signal means 112–114 to be operated by the user.

An instruction plate 13 is preferably located at the right middle portion of the front door and a coin return slot 12 is preferably located at the left side on the middle part of the front door for giving change and refunds. A mail receiving time table 15 is preferably located beneath middle portion of the front door. Four movable wheels 16 are preferably mounted at the bottom of said housing and two of them located in the front are preferably provided with a braking device for resisting movement. An automatic on/off device 17 is located at the bottom of said housing, and controls a fluorescent lamp 21, shown in FIG. 2, so that said automatic mail items handling device is able to be operated all day long.

Figure 4:
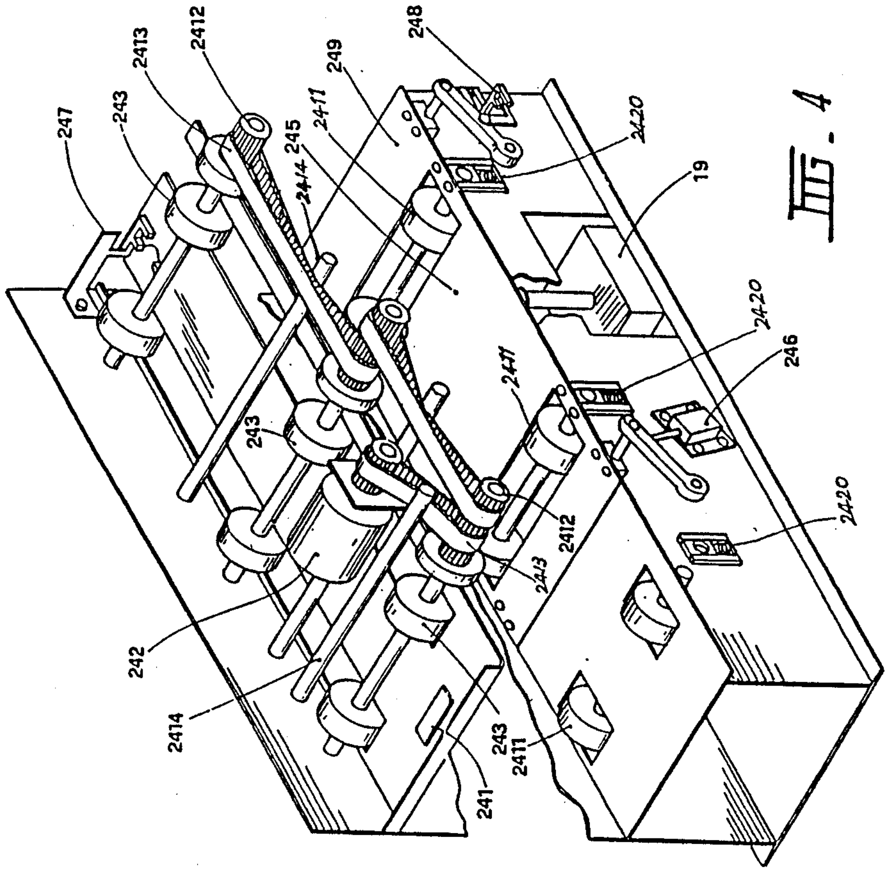
FIG. 4 is a partly exploded view of conveying mechanisms of an automatic mail items handling device according to a preferred embodiment of this invention.

Referring to FIG. 4, a conveying mechanism 24 for letters includes a driving motor 242 which is located at the upper portion of said conveying mechanism and is arranged to cause rotation of drive rollers 243 through pulleys 2412 and belt 2413. A driven roller 2411 rotates with said drive roller 243 by friction to move letters forward or backward. Said belt 2413 can be adjusted to be tight or loose by belt tensioning arm 2414. Said driven roller 2411 can be adjusted upward or downward automatically to adapt to the thickness of mail items. Three photo interrupters 241, 247, 248 are provided to detect the arrival, dropping, location and weighing respectively of letters. Two solenoids 246 are provided to control the upward and the downward movements of a swing plate 249 with a four bar linkage so as to position mail items on a weighing surface 245 for obtaining their exact weight. Said weighing surface 245 is also used as a support surface for items and assists in their rapid movement. The lower part of said mechanism is provided with an electronic weighing machine 19, in which a load cell is used as a weight sensor. The weighing range for said weighing machine 19 is flexible and its accuracy is up to 0.1 gram. Appropriate circuitry is provide to produce an output from the load cell to an RS232 interface to the microcomputer controller, which is arranged to zero the scale automatically. All the mechanisms are run by instructions from the microcomputer controller.

Figure 5:
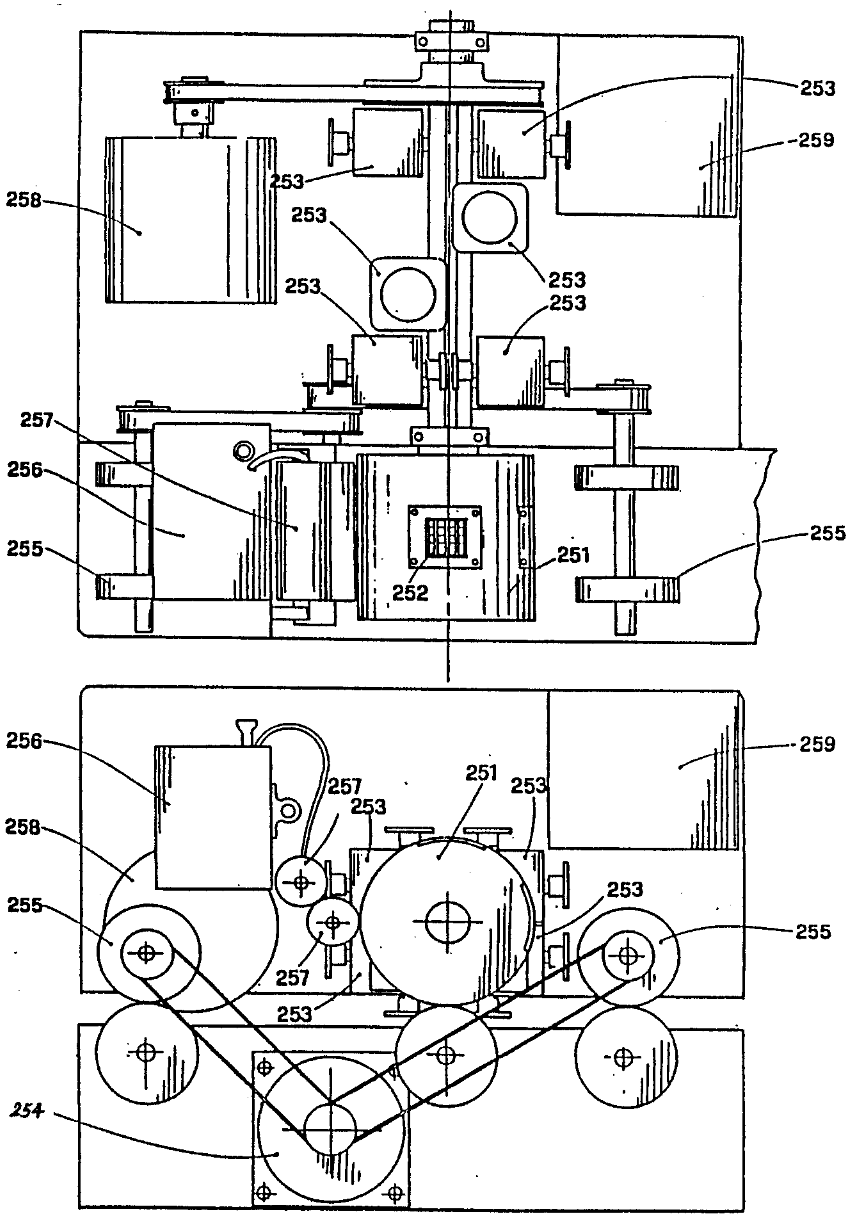
FIG. 5 is an automatic postage marking machine of the device of FIG. 1.

FIG. 5 illustrates a preferred embodiment of the automatic postage marking machine incorporated in the device according to the invention. The marking machine includes a main driving motor 254 which is located at the lower part of said automatic postage marking machine and is used to drive rollers 255 for moving mail items. The operation is similar to that of the conveying mechanism 242, 243, described above. A roller 251 is located at the middle part of said automatic postage marking machine and is provided with two sets of character wheels 252. A first one of these two sets of character wheels 252 is rotated by stepping motor 253. The second set of character wheels is used for printing the date, both character wheels for printing year and month are provided with one row, and character wheels for printing days have two rows of character wheels, and also they are rotated by a date stepping motor 253 respectively. Outer surfaces on the rollers 251 can carry postage marks, date, stamp figures and advertising logos in accordance with the instruction of said microcomputer controller.

Roller 251 is rotated by a driving motor 258 to provide ink for stamping. An ink pump 256 in front of said roller 251 is provided to deliver ink to ink roller 257. Thus, roller 251 is inked while rotating.

Figure 2:
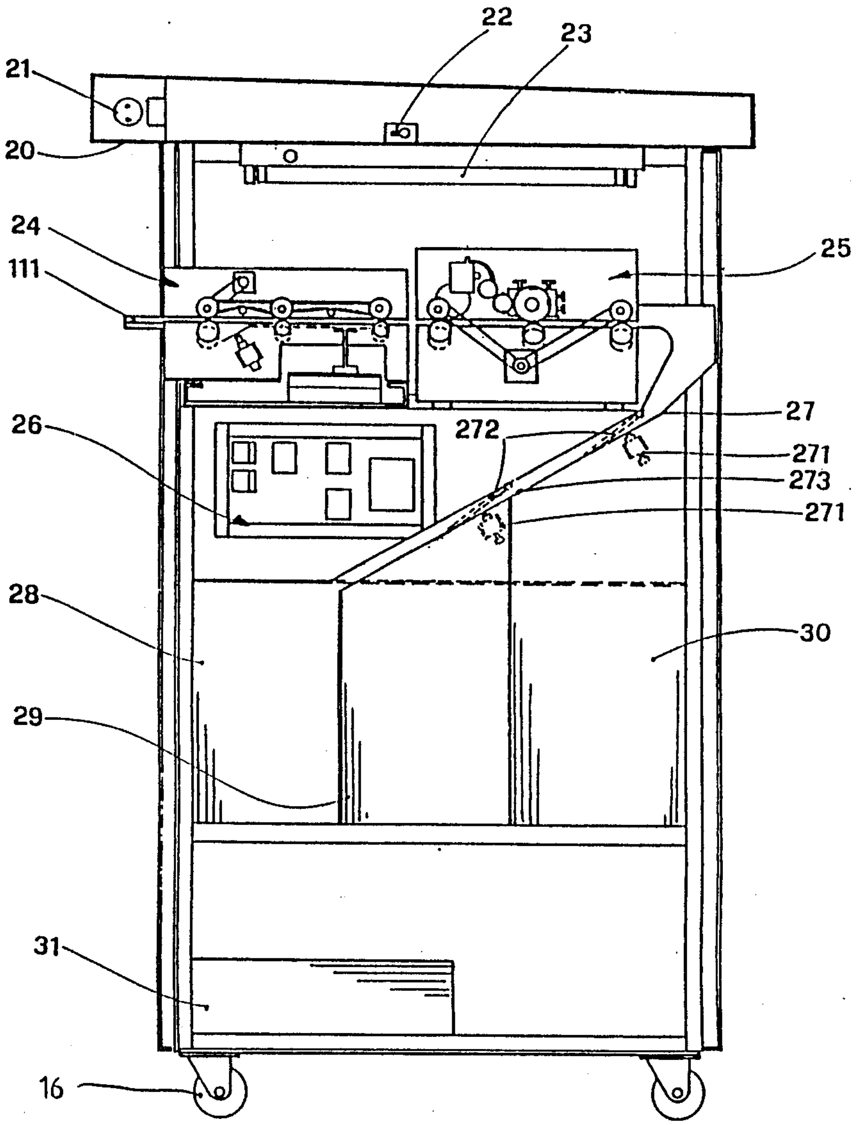
FIG. 2 is a right side view of the internal construction in an automatic mail items handling device according to a preferred embodiment of this invention.

The device also includes a printer 259 for recording and printing the date, accumulated mail quantity, postage, and machine series number, etc. A switch 22, shown in FIG. 2, is used to control said printer 259. The whole operation of said automatic postage machine is controlled by instructions from the microcomputer controller.

The device according to the invention also incorporates a mail sorting machine.

Referring now to FIG. 2, a chute 27 is provided with two solenoids 271 to control two swing plates 272. These two solenoids 271 are operated by the microcomputer controller 31. By operating swing plate 272, mail items can be directed into three different mail boxes 28, 29, 30 which are for ordinary mail, express mail, and air mail respectively.

The device illustrated also includes an automatic coin identifying and changing device.

Figure 3:
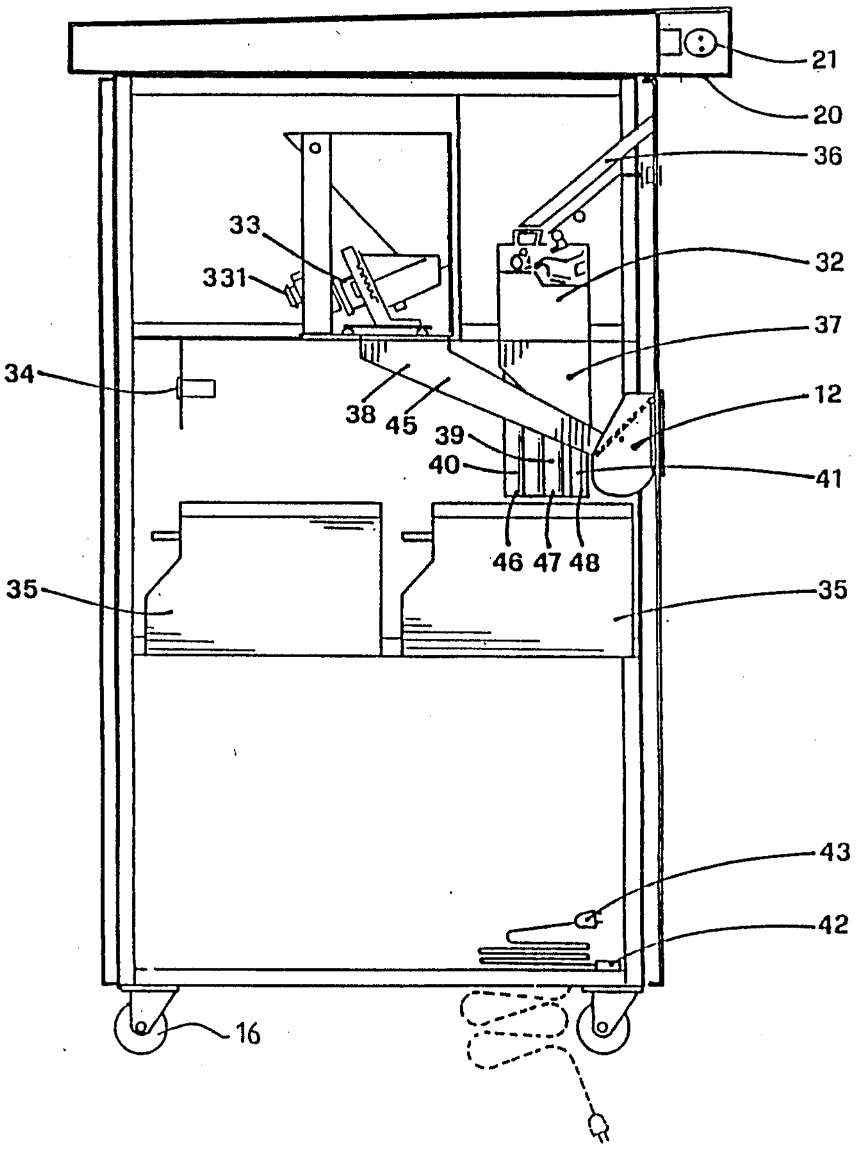
FIG. 3 is a left side view of the internal construction in an automatic mail items handling device according to a preferred embodiment of this invention.

Referring now to FIG. 3, a coin identifying means 32 is able to distinguish coins of various values. The upper part of said device is a coin guide rail 36 for distinguishing coins inserted. The lower part of said device is provided with a small coin rail 39, medium coin rail 40, large coin rail 41 and a return coin rail 41. The device is arranged to detect the number of coins entering coin box 35 and for enabling easy calculating and recording. The inlet of coin box is designed as a "Y" type and locked to prevent coins from being stolen. The rear part of said device is provided with changing means 33 which is able to deliver change via a chute 38 to coin return opening 12 on operation of motor 331. Chute 38 is provided with a photo interrupter 45 to detect the amount of change given. Four counters 34 are also located at the rear part to indicate the total number of coins entering the coin box and the amount of change given. Said device is also operated under the control of the microcomputer.

The microprocessor employed is preferably an 8085 with an associated program in EPROM, and this is used to control the automatic mail items handling device, postage calculation and automatic change of date. An I/O card for the processor is provided with a photoelectric connection to avoid distortion of information by interference. The controller is also programmed so as to enable detection of internal errors in the apparatus and to display an appropriate "out of order" signal on the face panel.

Figure 6:
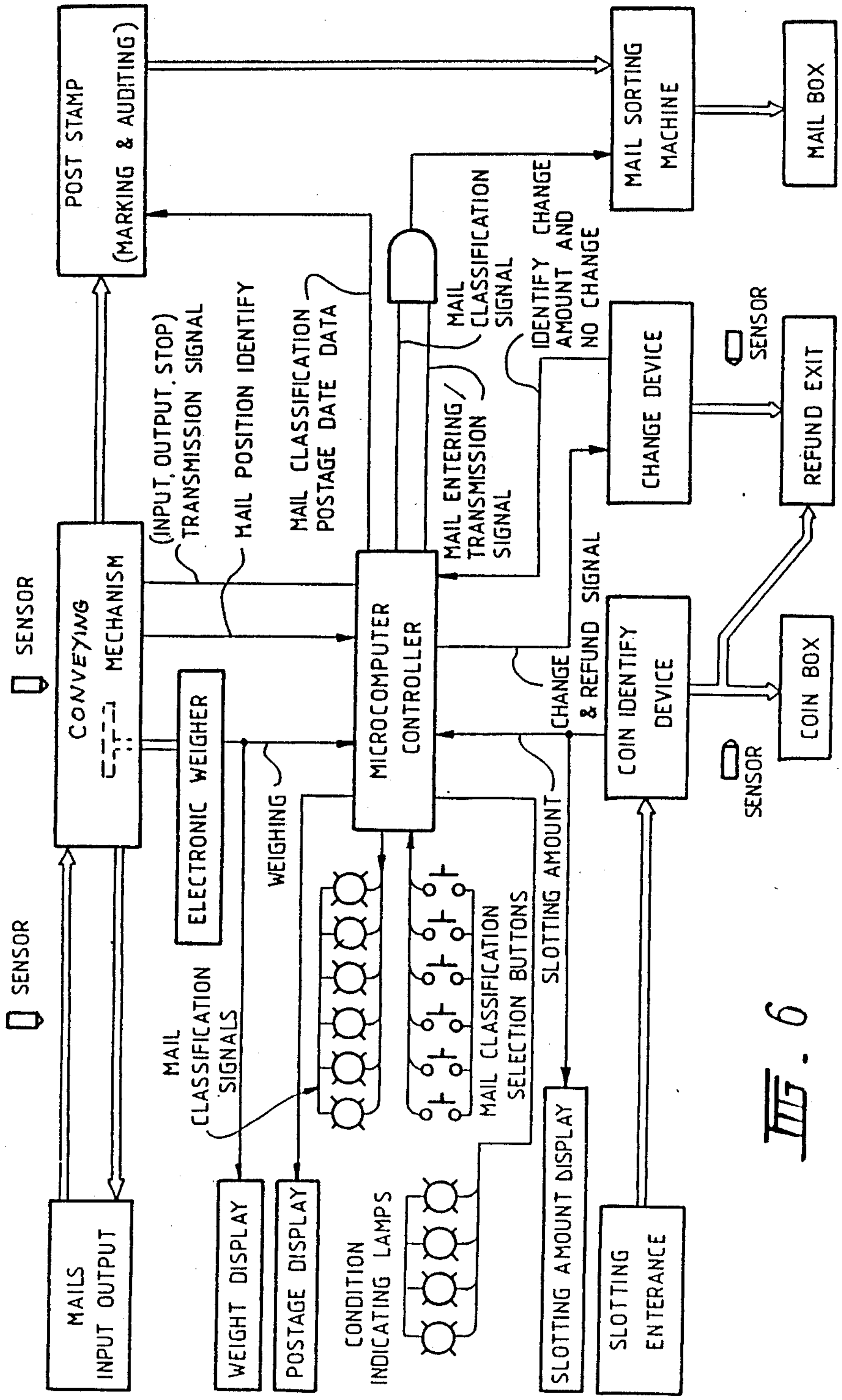
FIG. 6 is a block diagram showing the whole system of an automatic mail items handling device according to a preferred embodiment of this invention.
Figure 7:
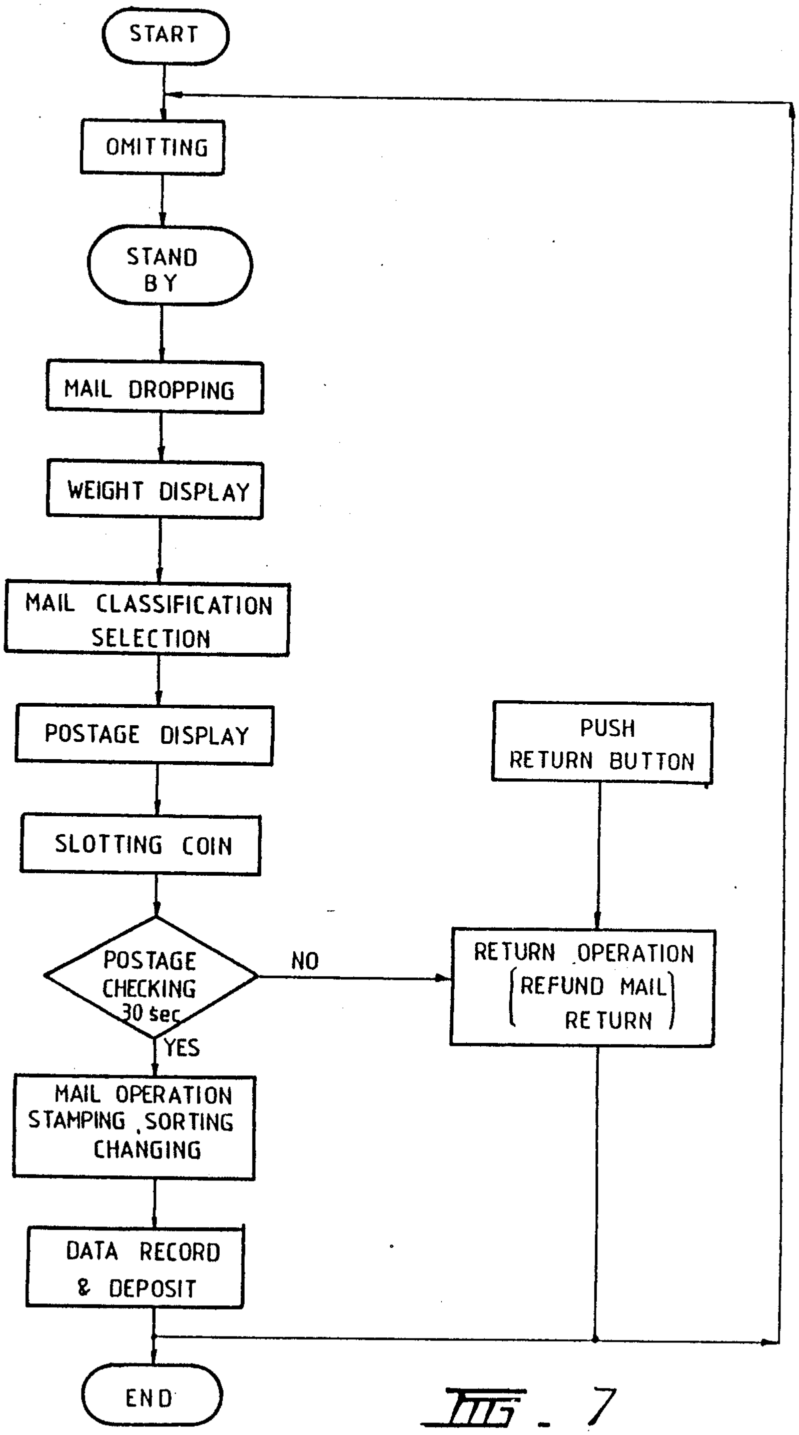
FIG. 7 is an operation flow chart of an automatic mail items handling device according to a preferred embodiment of this invention.
Figure 8:
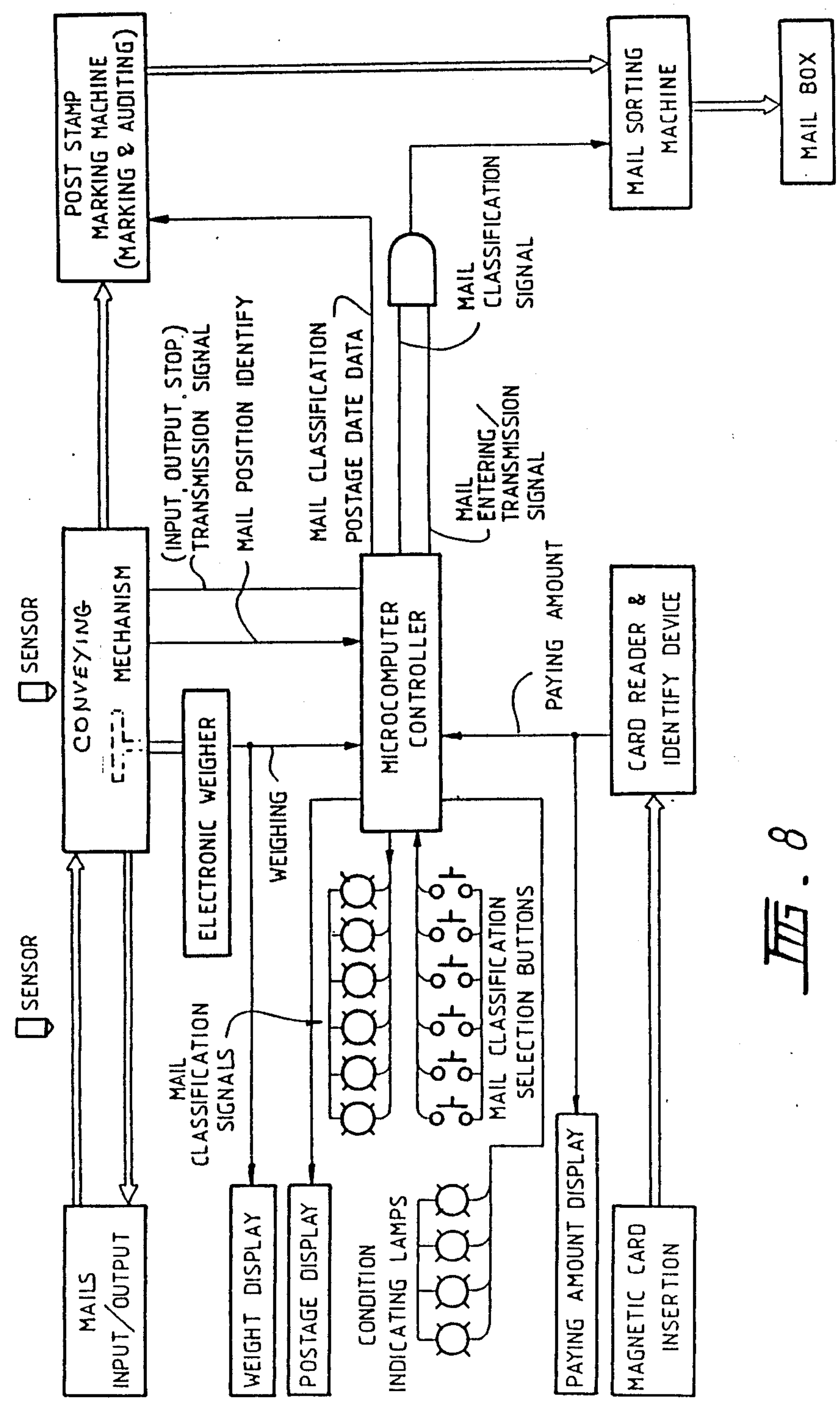
FIG. 8 is an operation flow chart of an automatic mail items handling device using a magnetic card instead of coins.

FIGS. 6 and 7 illustrate an operating flow chart for the operation sequence of a device as described above. The "power source" indicating light 101 on the face plate, see FIG. 3, is connected to an alternating current socket and indicates that mail can be accepted by the automatic handling device. When a mail item is inserted into the inlet/outlet slot, the photo interrupter 241 of the conveying mechanism 24, see FIGS. 2 and 4, immediately senses this and the "working" indicating light 102 on the face panel (FIG. 1) is turned on. The stepping motor 242 (FIG. 4) then rotates forward to drive the driving roller 243 so as to bring the inserted mail item to the weighing surface 245. Photo interrupter 247 senses this and stops the driving motor 242. Solenoid 246 then draws the swing plate with four bar linkage 249 down to the locating position. Photo interrupter 248 senses this and causes electronic weighing machine 19 to start weighing. The weight indicating means 112 on the face panel 11 (FIG. 1) shows the weight of the mail item. One of the mail classification select buttons 115–119 is then depressed. If the button lights and a buzzing sound is produced, this signifies that the input signal is effective. At this moment, the postage indicating means 113 shows the required amount of postage. Coins are then inserted into the coin slot 18, and enter the coin identification means 32 by way of the rail 36 (FIG. 3). Coins enter the appropriate coin box 35 through rail 39–41 and trigger photo interrupter 46–48, which senses a signal and causes the counter to total the value of the inserted coins. An indicator 114 (FIG. 1) on the face panel shows the value of coins inserted. Non-permitted coins are returned via coin return opening 12 and chute 37. Coins inserted may be returned by way of changing device 33 and chute 38 senses a signal during the changing procedure and the counter totals the amount of change given.

After sufficient coins have been received, the solenoid 246 (FIG. 4) is released and the four bar linkage swing plate moves upward to the original place. Driving motor 242 rotates forward to bring mail into the postage marking section 25 (FIG. 2). The postage marking machine is controlled by the microcomputer controller after sufficient payment has been received and the stepping motor 253 (FIG. 5) rotates the postage and data number wheel 252 in the roller 251 to indicate the appropriate postage and date. When mail items are moved in by means of the stepping motor 254 rotating the driving roller 255, the roller 251 will rotate to ink the ink roller 257 and to transport the mail items.

The above operations are carried out sequentially and swiftly. The mail items move continuously into the mail sorting section 27 (FIG. 2). The mail sorting section operates to sort mail entering the machine. The solenoid 271 lifts the swing plate 272 so that mail can move into different mail boxes 28–30. At this moment, the weight and postage indication on the face panel is removed and the "working" indicating light is extinguished, to indicate that the process is finished.

When insufficient coins are inserted or the sender changes his mind, the return mail button 110 (FIG. 1) on the face panel can be pressed which causes the botton to illuminate, and a buzzer to sound. In this case, the driving motor 242 will rotate in reverse to return the mail item and payment to the user. Otherwise, the original mail item and coins will be returned automatically after 30 seconds.

If it is desired to list the quantity and value in various postage categories, switch 22 is operated, and the printer 259 (FIG. 5) prints out an appropriate list.

All the above components are mounted in a single housing.

At least in its preferred embodiment, this invention provides a microcomputerized automatic mail item handling device which is able to receive mail, weigh mail, calculate and receive postage, change, stampmark, sort mail, classify and count mail, memorize and record postage income, and so on. By microcomputer control, which can automatically carry out all operations in the mail items handling device within about ten seconds, advantages such as time saving, labour saving and accuracy become feasible.

In the device illustrated, an electronic weighing machine is used to weigh mail and to calculate the postage automatically so that problems of inadequate postage caused by overweight mail or senders' misunderstanding suitable postage may be avoided. It is also easy to revise the computer program to adapt to new postage rates.

Furthermore, postage and date stamping are completely controlled by the microcomputer so that it can be operated automatically and it is not necessary to employ postage stamps or postage marking labels by hand.

A printer is used to record automatically the classification and the quantity for mail, and a counter is used to record cumulatively the amount of postage, coins received and changed so that changing jobs become easier. The device is able to return mail and coins if the sender happens to have insufficient coins after inserting coins or if the sender should change his mind and desire to withdraw the mail.

It should, of course, be understood that the above described embodiment of this invention is only an example, and various changes and modifications are possible within the scope of this invention. For example, the coin accepting and changing portions of the device can be replaced by magnetic card reading means or paper currency accepting and changing means.

I claim:

1. An automatic mail item handling device comprising a housing and a microcomputer controller, said housing having an inlet for a mail item;

a mail item weighing means for determining the weight of the mail item located adjacent to the inlet and operatively connected to the microcomputer controller;

a first conveying means for conveying a mail item from the inlet to the weighing means, said conveying means being located adjacent to the weighing means and being operatively connected to the microcomputer;

a return means operable by a user for causing return of the mail item to the user said return means comprising a button operatively connected to the microcomputer;

a selecting means to enable a user to select a desired mail classification, said selecting means being operatively connected to said microcomputer;

a calculating means for calculating appropriate postage due for the mail item in dependence upon weight and mail classification thereof, said calculating means being contained within said microcomputer;

an indicating means for indicating to the user the weight of and postage due for the mail item, said indicating means being mounted on said housing;

a payment receiving means for receiving a payment taken from a user the payment receiving means being mounted on the housing and operatively connected to a verifying means;

the verifying means for verifying said payment token against the postage due for the mail item, said verifying means being operatively connected to said microcomputer;

a postage marking means for marking the mail item, the the postage marking means being operatively connected to said microcomputer;

a second conveying means for conveying the mail item from said weighing means to said postage marking means, said second conveying means being located adjacent to said postage marking means and being operatively connected to said microcomputer;

a sorting means for sorting mail items in accordance with said mail classification, said sorting means being connected to the postage marking means, said sorting means being operatively connected to said microcomputer;

wherein said first conveying means comprises means for automatically adjusting for mail item thickness and wherein the mail item weighing means comprises a roller mounted on a swing plate disposed above an electronic weigher, a linkage being attached to the swing plate for moving the swing plate from a first position to a second position, the first position for receiving a mail item, the second position for weighing a mail item, the linkage being activated by a solenoid driven by the microprocessor.

2. A device as claimed in claim 1, wherein the payment receiving means comprises an opening for depositing coins.

3. A device as claimed in claim 1, wherein the payment receiving means comprises means for receiving a magnetically coded card.

4. A device as claimed in claim 2, wherein the payment receiving means further comprises means for returning change to the user.

5. A device as claimed in claim 1 further comprising means for providing a printed postage receipt said means for providing a printed postage receipt being operatively connected to the microcomputer controller.

6. A device as claimed in claim 1, wherein the weighing means comprises a plate, means for detecting passage of said mail item over the plate, and means for removing a support from the plate to cause the mail item to load on said plate.

7. A device as claimed in claim 1, wherein means are provided for enabling printing out of details of mail handled in various categories.

8. A device as claimed in claim 1, wherein said device further comprises means for enabling output from the device of totals of numbers of items and postage amounts for each mail classification.

9. A device as claimed in claim 1, wherein the means for postage marking comprises a plurality of sets of character wheels for printing postage marks, date, stamp figures and advertising logos in accordance with an instruction of said microcomputer controller.

10. An automatic mail handling device comprising a housing, said housing containing a mail inlet/outlet opening and electronic indicating means;

a microprocessor controller;

a mail transmission and weighing mechanism, operatively connected to said microprocessor controller and located adjacent to said opening such that mail inserted into said opening enters into said transmission and weighing mechanism;

an automatic postage marking mechanism, operatively connected to said microprocessor controller and located adjacent to said transmission and weighing mechanism such that mail exiting from said transmission and weighing mechanism enters said postage marking mechanism;

a mail sorting mechanism, operatively connected to said microprocessor controller and located adjacent to said postage marking mechanism such that mail exiting from said postage marking mechanism enters said sorting mechanism;

a payment receiving means operatively connected to said microprocessor wherein when an item of mail is inserted in said inlet/outlet, said microprocessor activates said transmission and weighing mechanism, said item of mail is weighed, and postage is computed by the microprocessor controller;

when payment value is computed by the microprocessor controller, and if said value is greater than or equal to said postage computed, said transmission mechanism is activated by said microprocessor and said item of mail is transmitted to said postage marking mechanism, said microprocessor sending postage information to said postage marking mechanism and activating said postage marking mechanism to mark said item of mail with the postage computed;

said microprocessor then activating said postage marking mechanism to transmit said item of mail to said sorting mechanism and activating said sorting mechanism to direct the item of mail to one of a plurality of containers;

wherein said mail transmission and weighing mechanism comprises a roller mounted on a swing plate the swing plate disposed above an electronic weigher, a linkage being attached to the swing plate for moving the swing plate from a first position to a second position, the first position for receiving a mail item, and the second position for weighing a mail item, the linkage being activated by a linkage driving means driven by the microprocessor.

11. An automatic mail handling device as claimed in claim 10 comprising accumulating counting means operatively connected to said microprocessor such that the cumulative quantity of mail inserted and cumulative value of postage used can be determined.

12. An automatic mail handling device as claimed in claim 10, wherein said automatic mail transmission and weighing mechanism comprises an automatic transmission means which is reversible such that if the value deposited is less than the value of postage computed, said microprocessor activates said transmission means to eject said item of mail from said inlet/outlet and said microprocessor activates a payment return means.

13. An automatic mail handling device as claimed in claim 10, said automatic postage marking mechanism comprising a stepping motor operatively connected to said microprocessor driving a drive roller for transmitting said item of mail through said marking mechanism, a marking roller, said marking roller having a printing surface being provided with a plurality of rotatable number wheels for indicating postage amount and date, said number wheels being rotated by a stepping motor operatively connected to said microprocessor, an inking roller engaging the printing surface of said marking roller and supplied with ink by an ink pump.

14. A device as claimed in claim 10 further comprising a plurality of mail receiving containers, adjacent to said sorting mechanism such that mail exiting from said sorting mechanism enters into one of said containers, and wherein the payment receiving means comprises a coin acceptance slot connected to a coin changing means.

15. An automatic mail handling device as claimed in claim 14 comprising means for selecting among a plurality of postage classes, each of said classes corresponding to one of said plurality of containers, said selecting means operatively connected to said microprocessor such that said postage computed is adjusted according to postage class selected and said sorting mechanism is activated to direct said item of mail to the container corresponding to said selected class.

16. A device as claimed in claim 10 further comprising; a plurality of photodetectors for determining the position of said item of mail such that when said item of mail is inserted into said inlet/outlet, one of said photodetectors signal said microprocessor which in turn activates a stepping motor which drives the roller and said item of mail is thereby transmitted by said roller to said swing plate, another of said photodetectors signalling said microprocessor which then halts said stepping motor and activates said linkage driving means, which comprises a solenoid, to thereby lower said swing plate onto said electronic weigher which then signals to said microprocessor a value corresponding to the weight of said item of mail.

17. An automatic mail handling device comprising a housing, said housing containing a mail inlet/outlet opening and electronic indicating means;

a microprocessor controller;

a mail transmission and weighing mechanism, operatively connected to said microprocessor controller and located adjacent to said opening such that mail inserted into said opening enters into said transmission and weighing mechanism;

an automatic postage marking mechanism, operatively connected to said microprocessor controller and located adjacent to said transmission and weighing in mechanism such that mail exiting from said transmission and weighing mechanism enters said postage marking mechanism;

a mail sorting mechanism, operatively connected to said microprocessor controller and located adjacent to said postage marking mechanism such that mail exiting from said postage marking mechanism enters said sorting mechanism;

a payment receiving means operatively connected to said microprocessor wherein when an item of mail is inserted in said inlet/outlet, said microprocessor activates said transmission and weighing mechanism, said item of mail is weighed, and postage is computed by the microprocessor controller;

when payment value is computed by the microprocessor controller and if said value is greater than or equal to said postage computed, said transmission mechanism is activated by said microprocessor and said item of mail is transmitted to said postage marking mechanism, said microprocessor sending postage information to said postage marking mechanism and activating said postage marking mechanism to mark said item of mail with the postage computed;

said microprocessor then activating said postage marking mechanism to transmit said item of mail to said sorting mechanism and activating said sorting mechanism to direct the item of mail to one of a plurality of containers;

wherein said automatic transmission and weighing mechanism further comprises a stepping motor operatively connected to said microprocessor and driving a driving roller and a driven roller by friction from said driving roller;

said item of mail passing between said rollers, said driven roller being provided with means for automatically adjusting for the thickness of said item of mail;

said driven roller being mounted on a plate;

an electronic weigher located beneath said plate and adapted to weigh items resting on the plate, the plate being operatively connected to the microprocessor.

* * * * *

UNITED STATES PATENT AND TRADEMARK OFFICE
CERTIFICATE OF CORRECTION

PATENT NO. : 4,940,887

DATED : July 10, 1990

INVENTOR(S) : Sheng-Jung Wu

It is certified that error appears in the above-identified patent and that said Letters Patent is hereby corrected as shown below:

Cover page, column 1, item [76], line 1, delete "Wu Sheng-Jung" and substitute therefor --Sheng-Jung Wu--.

Under item [19], "Sheng-Jung" should read --Wu--.

Signed and Sealed this

Twenty-fifth Day of June, 1991

*Attest:*

HARRY F. MANBECK, JR.

*Attesting Officer*

*Commissioner of Patents and Trademarks*